(12) United States Patent
Chan et al.

(10) Patent No.: US 11,061,693 B2
(45) Date of Patent: *Jul. 13, 2021

(54) REPROGRAMMING A FIELD PROGRAMMABLE DEVICE ON-DEMAND

(71) Applicant: INTERNATIONAL BUSINESS MACHINES CORPORATION, Armonk, NY (US)

(72) Inventors: Yuk L Chan, Rochester, NY (US); Andrew P. Wack, Millbrook, NY (US); Peter B. Yocom, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/420,211

(22) Filed: May 23, 2019

(65) Prior Publication Data

US 2019/0286455 A1 Sep. 19, 2019

Related U.S. Application Data

(63) Continuation of application No. 15/271,728, filed on Sep. 21, 2016, now Pat. No. 10,417,012.

(51) Int. Cl.
  *G06F 1/24* (2006.01)
  *G06F 9/445* (2018.01)
  (Continued)

(52) U.S. Cl.
  CPC .......... *G06F 9/44505* (2013.01); *G06F 8/654* (2018.02); *G06F 9/5083* (2013.01); *G06F 8/65* (2013.01); *G06F 9/4411* (2013.01)

(58) Field of Classification Search
  CPC .................................................. G06F 9/5083
  (Continued)

(56) References Cited

U.S. PATENT DOCUMENTS 5,473,773 A * 12/1995 Aman ................... G06F 9/5083
                                                          718/103
5,530,862 A    6/1996 Wadsworth et al.
(Continued)

FOREIGN PATENT DOCUMENTS

CN    101826025 A    9/2010
CN    103885771 A    6/2014
(Continued)

OTHER PUBLICATIONS

"Microsoft Computer Dictionary"; Container; 5th Edition; 2002; p. 125.
(Continued)

*Primary Examiner* — Volvick Derose
(74) *Attorney, Agent, or Firm* — Cantor Colburn LLP; Teddi Maranzano

(57) ABSTRACT

Examples of techniques for reprogramming a field programmable device on demand are disclosed. According to aspects of the present disclosure, a computer-implemented method may include: identifying a first field programmable device as being over utilized; responsive to identifying the first field programmable device that is over utilized, identifying a second field programmable device that is underutilized; determining whether to reprogram the second field programmable device; responsive to determining to reconfigure the second field programmable device, stopping the second field programmable device from performing a workload; moving the workload to another field programmable device configured to perform the workload; and reprogramming the second field programmable device.

20 Claims, 5 Drawing Sheets

(51) Int. Cl.
  *G06F 9/50* (2006.01)
  *G06F 8/654* (2018.01)
  *G06F 9/4401* (2018.01)
  *G06F 8/65* (2018.01)

(58) Field of Classification Search
  USPC .................................................. 713/100
  See application file for complete search history.

(56) References Cited

U.S. PATENT DOCUMENTS

| | | | |
|---|---|---|---|
| 5,742,180 | A | 4/1998 | Dehon et al. |
| 5,752,035 | A * | 5/1998 | Trimberger .............. G06F 8/447 |
| | | | 712/229 |
| 6,369,610 | B1 | 4/2002 | Cheung et al. |
| 6,442,732 | B1 * | 8/2002 | Abramovici ............ G06F 30/34 |
| | | | 716/117 |
| 6,525,560 | B1 | 2/2003 | Trimberger et al. |
| 6,604,230 | B1 * | 8/2003 | Khalid ................ G06F 15/7867 |
| | | | 326/38 |
| 6,867,614 | B1 | 3/2005 | Le Graverand et al. |
| 7,080,146 | B2 | 7/2006 | Bradford et al. |
| 7,146,598 | B2 | 12/2006 | Horanzy |
| 7,272,081 | B2 | 9/2007 | Goodman et al. |
| 7,299,203 | B1 | 11/2007 | Nelson |
| 7,389,435 | B2 | 6/2008 | Barr et al. |
| 7,496,539 | B1 | 2/2009 | Bai et al. |
| 7,644,137 | B2 | 1/2010 | Bozak et al. |
| 7,646,725 | B1 | 1/2010 | Soukup et al. |
| 7,788,040 | B2 | 8/2010 | Haskell et al. |
| 7,902,866 | B1 | 3/2011 | Patterson et al. |
| 7,996,346 | B2 | 8/2011 | Bell, Jr. et al. |
| 8,015,395 | B1 * | 9/2011 | Lewis ..................... G06F 30/34 |
| | | | 713/2 |
| 8,081,079 | B1 | 12/2011 | Camarota |
| 8,181,175 | B1 | 5/2012 | McKee et al. |
| 8,305,903 | B1 | 11/2012 | Louise et al. |
| 8,645,529 | B2 | 2/2014 | Doddavula |
| 8,654,637 | B2 | 2/2014 | Scaglione |
| 8,856,335 | B1 | 10/2014 | Yadwadkar et al. |
| 9,032,344 | B2 | 5/2015 | Chene |
| 9,032,399 | B1 | 5/2015 | Yang et al. |
| 9,270,624 | B2 | 2/2016 | Zhuang et al. |
| 9,292,336 | B1 | 3/2016 | Ramalingam et al. |
| 9,348,724 | B2 | 5/2016 | Ota et al. |
| 9,356,883 | B1 | 5/2016 | Borthakur |
| 9,367,379 | B1 | 6/2016 | Burke et al. |
| 9,465,630 | B1 | 10/2016 | Muniz |
| 9,563,446 | B2 | 2/2017 | Sandlin et al. |
| 9,614,972 | B2 | 4/2017 | Ballai et al. |
| 9,685,956 | B1 | 6/2017 | Chan et al. |
| 9,864,636 | B1 | 1/2018 | Patel et al. |
| 9,973,193 | B2 | 5/2018 | Chan |
| 9,996,334 | B2 | 6/2018 | Chan |
| 10,021,008 | B1 | 7/2018 | Pai et al. |
| 10,248,466 | B2 | 4/2019 | Chan |
| 10,296,397 | B2 | 5/2019 | Richter et al. |
| 2002/0038340 | A1 | 3/2002 | Whipple et al. |
| 2002/0080784 | A1 * | 6/2002 | Krumel ................... H04L 69/16 |
| | | | 370/389 |
| 2003/0086300 | A1 * | 5/2003 | Noyes ..................... G06F 9/547 |
| | | | 365/189.15 |
| 2004/0111248 | A1 | 6/2004 | Granny et al. |
| 2004/0122647 | A1 | 6/2004 | Monroe et al. |
| 2004/0141386 | A1 * | 7/2004 | Karlsson ................ G06F 30/34 |
| | | | 365/200 |
| 2004/0243692 | A1 | 12/2004 | Arnold et al. |
| 2005/0097305 | A1 * | 5/2005 | Doering ................ G06F 9/3897 |
| | | | 712/226 |
| 2005/0216585 | A1 | 9/2005 | Todorova et al. |
| 2005/0216860 | A1 | 9/2005 | Petrov et al. |
| 2005/0259484 | A1 | 11/2005 | Newell |
| 2007/0074045 | A1 | 3/2007 | Van Essen et al. |
| 2007/0283358 | A1 * | 12/2007 | Kasahara .............. G06F 9/5044 |
| | | | 718/104 |
| 2008/0028186 | A1 * | 1/2008 | Casselman .......... G06F 15/7867 |
| | | | 712/37 |
| 2008/0082983 | A1 | 4/2008 | Groetzner et al. |
| 2008/0183777 | A1 | 7/2008 | Xi et al. |
| 2008/0270199 | A1 | 10/2008 | Chess et al. |
| 2009/0063709 | A1 | 3/2009 | Rice et al. |
| 2009/0228224 | A1 * | 9/2009 | Spanier .................. G01R 22/10 |
| | | | 702/60 |
| 2009/0300608 | A1 | 12/2009 | Ferris et al. |
| 2010/0042450 | A1 | 2/2010 | Binswanger et al. |
| 2010/0049963 | A1 * | 2/2010 | Bell, Jr. .............. G06F 15/7871 |
| | | | 713/100 |
| 2010/0070260 | A1 * | 3/2010 | Mori ...................... G06F 30/33 |
| | | | 703/28 |
| 2010/0180275 | A1 | 7/2010 | Neogi et al. |
| 2010/0281285 | A1 * | 11/2010 | Blanding ............... G06F 9/5027 |
| | | | 713/324 |
| 2011/0131580 | A1 * | 6/2011 | Krishnamurthy ..... G06F 9/5038 |
| | | | 718/102 |
| 2011/0153507 | A1 | 6/2011 | Murthy et al. |
| 2011/0161972 | A1 * | 6/2011 | Dillenberger ......... G06F 9/5044 |
| | | | 718/104 |
| 2011/0196907 | A1 * | 8/2011 | Kusmanoff ............ G06F 17/13 |
| | | | 708/446 |
| 2011/0231644 | A1 | 9/2011 | Ishebabi |
| 2011/0258634 | A1 | 10/2011 | Bonilla et al. |
| 2012/0096093 | A1 | 4/2012 | Bouw et al. |
| 2012/0189913 | A1 | 7/2012 | Wakizaka et al. |
| 2012/0203754 | A1 | 8/2012 | Biran et al. |
| 2012/0254111 | A1 | 10/2012 | Carmichael |
| 2012/0324417 | A1 | 12/2012 | Somani et al. |
| 2013/0007759 | A1 * | 1/2013 | Krishnamurthy ......... G06F 9/50 |
| | | | 718/104 |
| 2013/0007762 | A1 * | 1/2013 | Krishnamurthy ..... G06F 9/5044 |
| | | | 718/104 |
| 2013/0031553 | A1 * | 1/2013 | Hou ...................... G06F 9/4843 |
| | | | 718/100 |
| 2013/0061033 | A1 * | 3/2013 | Kim ....................... G06F 9/3877 |
| | | | 713/100 |
| 2013/0179894 | A1 | 7/2013 | Calder et al. |
| 2013/0226764 | A1 * | 8/2013 | Battyani ............. G06Q 30/0201 |
| | | | 705/37 |
| 2013/0232328 | A1 * | 9/2013 | Johnson .................... G06F 8/60 |
| | | | 713/2 |
| 2013/0232495 | A1 * | 9/2013 | Rossbach .............. G06F 9/5044 |
| | | | 718/102 |
| 2013/0311738 | A1 * | 11/2013 | Jiang .................... G06F 12/1027 |
| | | | 711/163 |
| 2013/0346979 | A1 | 12/2013 | Nightingale et al. |
| 2014/0047342 | A1 * | 2/2014 | Breternitz ............. G06F 9/5061 |
| | | | 715/735 |
| 2014/0074641 | A1 | 3/2014 | Wnag |
| 2014/0130051 | A1 * | 5/2014 | Fleischer .............. G06F 9/5044 |
| | | | 718/102 |
| 2014/0137104 | A1 | 5/2014 | Nelson et al. |
| 2014/0137107 | A1 | 5/2014 | Banerjee et al. |
| 2014/0215424 | A1 * | 7/2014 | Fine ....................... G06F 30/34 |
| | | | 716/117 |
| 2014/0244841 | A1 | 8/2014 | Gulati |
| 2014/0258535 | A1 | 9/2014 | Zhang |
| 2014/0279985 | A1 | 9/2014 | Fontenot et al. |
| 2014/0317265 | A1 | 10/2014 | James et al. |
| 2014/0351811 | A1 | 11/2014 | Kruglick |
| 2014/0359113 | A1 | 12/2014 | Krebs et al. |
| 2015/0032817 | A1 | 1/2015 | Garg et al. |
| 2015/0040112 | A1 | 2/2015 | Valencia |
| 2015/0058863 | A1 | 2/2015 | Karamanolis et al. |
| 2015/0067220 | A1 | 3/2015 | Schwach et al. |
| 2015/0100971 | A1 * | 4/2015 | Dube ........................ G06F 9/445 |
| | | | 719/319 |
| 2015/0113268 | A1 | 4/2015 | Wu |
| 2015/0123706 | A1 | 5/2015 | Cong et al. |
| 2015/0146675 | A1 | 5/2015 | Zhang et al. |
| 2015/0177811 | A1 * | 6/2015 | Bose ....................... G06F 1/3243 |
| | | | 713/324 |
| 2015/0205714 | A1 | 7/2015 | Greenfield et al. |
| 2015/0281018 | A1 | 10/2015 | Britt et al. |

(56) References Cited

U.S. PATENT DOCUMENTS

| | | |
|---|---|---|
| 2015/0296002 A1 | 10/2015 | Pell |
| 2015/0309789 A1 | 10/2015 | Thorat |
| 2015/0363133 A1 | 12/2015 | Bobroff et al. |
| 2016/0019074 A1 | 1/2016 | Nahir et al. |
| 2016/0036886 A1 | 2/2016 | Ito |
| 2016/0048391 A1 | 2/2016 | Somani et al. |
| 2016/0154681 A1* | 6/2016 | Chen .................. G06F 9/5083 718/105 |
| 2016/0171611 A1 | 6/2016 | Sheng et al. |
| 2016/0191343 A1 | 6/2016 | Dong et al. |
| 2016/0232502 A1 | 8/2016 | Barbulescu et al. |
| 2016/0314025 A1 | 10/2016 | McGarry et al. |
| 2016/0321113 A1 | 11/2016 | Pinto et al. |
| 2016/0323161 A1* | 11/2016 | Cuervo Laffaye ...... H04L 43/08 |
| 2016/0328230 A1 | 11/2016 | Schneider et al. |
| 2016/0335120 A1 | 11/2016 | Gupta et al. |
| 2016/0350529 A1 | 12/2016 | Kerr et al. |
| 2016/0359683 A1 | 12/2016 | Bartfai-Walcott et al. |
| 2016/0378551 A1* | 12/2016 | Vaidya .................. G06F 9/5094 718/105 |
| 2017/0039050 A1 | 2/2017 | Eltsin et al. |
| 2017/0039069 A1* | 2/2017 | Mao .................... G06F 12/0875 |
| 2017/0060653 A1 | 3/2017 | Nandakumar et al. |
| 2017/0083386 A1 | 3/2017 | Wing et al. |
| 2017/0083703 A1 | 3/2017 | Abbasi et al. |
| 2017/0090987 A1 | 3/2017 | Hearn et al. |
| 2017/0097851 A1 | 4/2017 | Chen |
| 2017/0286142 A1 | 10/2017 | Palermo et al. |
| 2017/0353397 A1 | 12/2017 | Che |
| 2018/0011801 A1 | 1/2018 | Sengupta et al. |
| 2018/0040096 A1* | 2/2018 | Benthin .................. G06T 1/20 |
| 2018/0081701 A1 | 3/2018 | Chan et al. |
| 2018/0081724 A1 | 3/2018 | Chan et al. |
| 2018/0081725 A1 | 3/2018 | Chan et al. |
| 2018/0083845 A1 | 3/2018 | Chan et al. |
| 2018/0083846 A1 | 3/2018 | Chan |
| 2018/0159746 A1 | 6/2018 | Li et al. |

FOREIGN PATENT DOCUMENTS

| | | |
|---|---|---|
| CN | 104881666 A | 9/2015 |
| EP | 1093051 A2 | 4/2001 |
| WO | 03039052 A2 | 5/2003 |

OTHER PUBLICATIONS

Arnold et al.; "Workload Orchestration and Optimization for Software Defined Dnvironments"; IBM J. Res. & Dev.; vol. 58 No. 2/3; Mar./May 2014; 12 Pages.

Dalton et al.; "Raksha: A Flexible Information Flow Architecture for Software Security"; ISCA'07; Jun. 9-13, 2007; pp. 482-493.

Dayal et al.; "I/O Containers: Managing the Data Analytics and Visualization Pipelines of High End Codes"; IEEE 27th International Symposium on Parallel & Distributed Processing Workshops and PhD Forum; 2013; 10 Pages.

Garcia et al.; "SLA-Driven Dynamic Cloud Resource Management"; Future Generation Computer Systems; vol. 31; 2014; pp. 1-11.

Kindratenko et al.; "Dynamic Load-Balancing on Multi-FPGA Systems: A Case Study"; Retrieved online from http://www.ncsa.illinois.edu/.; Jun. 26, 2007; pp. 1-8.

Kornecki et al.; "Hardware Certification for Real-Time Safety-Critical Systems: State of the Art"; Art Reviews in Control; vol. 34, No. 1; 2010; pp. 163-174.

Kuznetsov et al.; "Testing Closed-Source Binary Device Drivers with DDT"; 2010; Retrieved Online from http://static.usenix.org/events/atc/tech/full_papers/Kuznetsov/pdf on Nov. 20, 2017; 14 Pages.

Leopoldi; "A Description of Service Level Agreements"; It Services Management; May 25, 2002; 9 Pages.

Lin et al.; "OpenRCL: Low-Power High-Performance Computing with Reconfigurable Devices"; International Conference on Filed Programmable Logic and Applications; 2010; 6 Pages.

Soni; "Cloud Computing and Chargeback Models"; Cloudbook Journal; vol. 3, Issue 1; 2012; 16 Pages.

Tosatto et al.; "Container-Based Orchestration in Cloud: State of the Art and Challenges"; 2015 Ninth International Conference on Complex, Intelligent, and Software Intensive Systems; 2015; pp. 70-75.

Tsoi et al.; "Power Profiling and Optimization for Heterogeneous Multi-Core System"; Department of Computing; Imperial College London; Aug. 29, 2011; 6 Pages.

List of IBM Patents or Patent Applications Treated as Related; Date Filed: May 23, 2019; 2 Pages.

Chan, Yuk L. et al., "Service Level Management of a Workload Defined Environment" U.S. Appl. No. 16/420,210, filed May 23, 2019.

* cited by examiner

REPROGRAMMING A FIELD PROGRAMMABLE DEVICE ON-DEMAND

DOMESTIC PRIORITY

This application is a continuation application of the legally related U.S. Ser. No. 15/271,728 filed Sep. 21, 2016, the contents of which are incorporated by reference herein in their entirety.

BACKGROUND

The present application generally relates to field programmable devices and, more particularly, to reprogramming a field programmable device on demand.

Special purpose processing units are gaining popularity due to their high performance. In some situations, hardware manufacturers have begun adding field-programmable device-based special purpose processing units to computing systems to improve performance and cost to run a special workload. A field-programmable device (FPD) such as a field programmable gate array (FPGA), a programmable read-only memory (PROM), or a programmable logic device (PLD) provides more flexible compared to traditional integrated circuit manufacturing by allowing updating of functionality after shipping the computing system (i.e., while the computing system is in the field). The update of functionality of an FPD is currently limited to firmware upgrades, service related tasks, or a human decision to re-purpose an FPD.

SUMMARY

According to examples of the present disclosure, techniques including methods, systems, and/or computer program products for reprogramming a field programmable device on demand are provided. An example method may include: identifying, by a processing device, a first field programmable device as being over utilized, wherein the first field programmable device is configured with a first set of computer readable instructions to perform a first workload type; responsive to identifying the first field programmable device that is over utilized, identifying, by the processing device, a second field programmable device that is underutilized, wherein the second field programmable device is configured with a second set of computer readable instructions different from the first set of computer readable instructions to perform a second workload type; determining whether to reprogram the second field programmable device with the first set of computer readable instructions; responsive to determining to reconfigure the second field programmable device with the first set of computer readable instructions, stopping the second field programmable device from performing a workload of the second workload type; moving the workload of the second workload type to another field programmable device configured to perform the workload of the second workload type; and reprogramming the second field programmable device with the first set of computer readable instructions to perform the first workload type.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Although previous approaches utilize updating the functionality of a field-programmable device (FPD), such updating is limited. Consequently, FPDs have not been fully exploited for their dynamic capability. Various implementations are described below by referring to several examples of reprogramming an FPD (e.g., a field-programmable gate array (FPGA), a programmable read-only memory (PROM), or a programmable logic device (PLD)) on demand. Some computing system manufacturers ship computing systems with a multiple FPDs included in the computing system. The FPDs may be enabled by a manual user request or by an automatic request by a software program executing on the computing system. The FPDs may also be assigned to perform a specific workload type by being programmed with a particular set of computer readable instructions for performing the specific workload. The present techniques provide for reprogramming an FPD on demand by loading a different set of computer readable instructions to the FPD to cause the FPD to perform a different specific workload type.

In some implementations, the present techniques provide improved functioning of the computing system by providing additional system resources (i.e., additional FPDs) on demand by reprogramming an FPD, such as in response to high demand for resources. Additionally, the present techniques reduce system resource demands on the general processor of the computing system by enabling FPDs to perform specialized tasks (e.g., encoding/decoding of data, data encryption, data analytics, etc.).

The present techniques also provide the ability to monitor and track the time that an FPD is enabled and performing a specific workload type so that a user may be billed for the time. In addition, the present techniques enable increased system performance by updating/reprogramming the FPD to perform different specialized tasks, thereby reducing the resource demands on the computing system's native resources (i.e., memory, general processor, etc.). These and other advantages will be apparent from the description that follows.

Figure 1A:
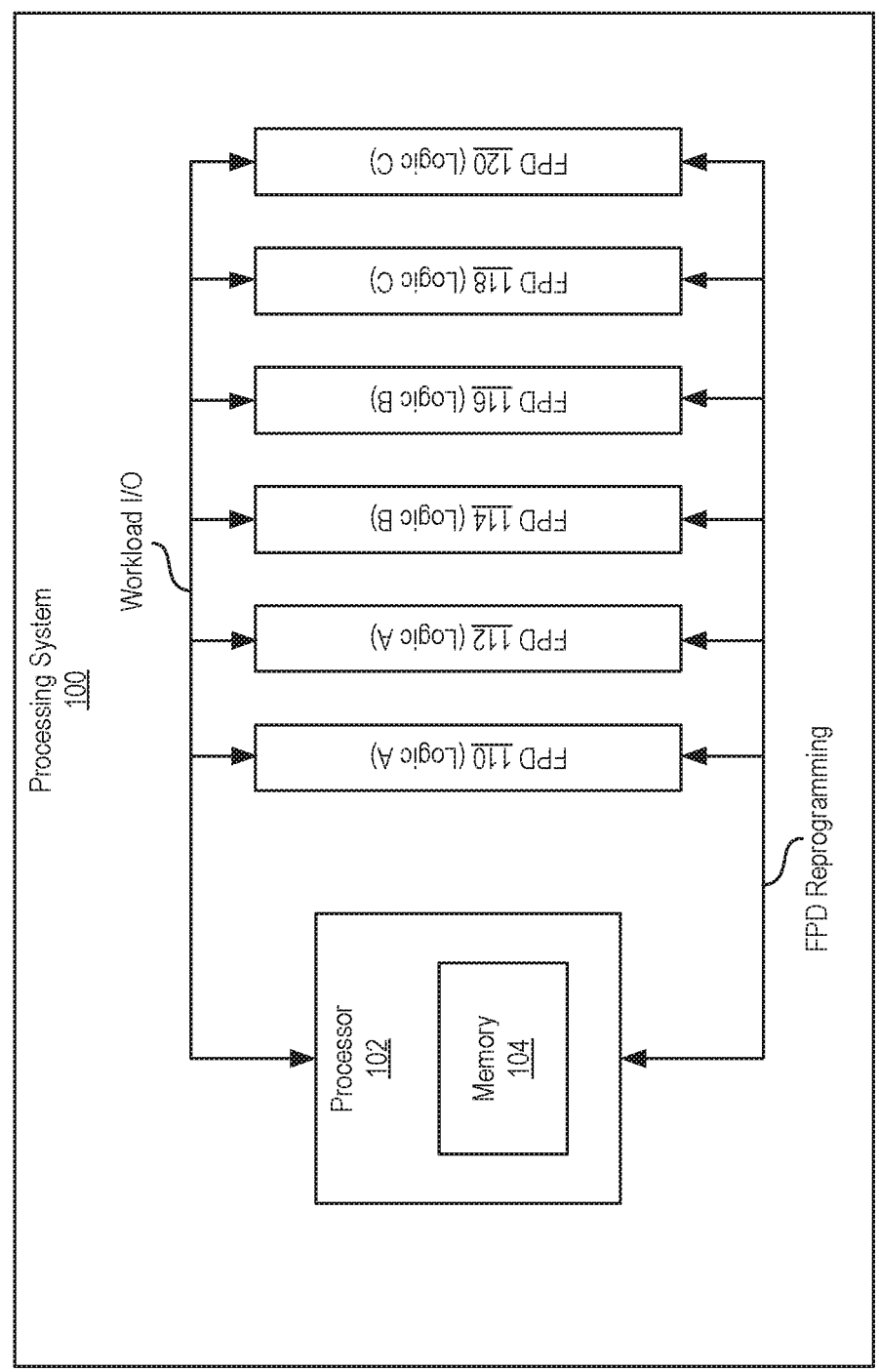
FIG. 1A and FIG. 1B illustrate a block diagram of a processing system for reprogramming a field programmable device on demand according to examples of the present disclosure.

FIG. 1A illustrates a block diagram of a processing system 100 for reprogramming an FPD on demand according to examples of the present disclosure. The processing system 100 includes a processor 102 that may be a general purpose processor and a memory 104 associated with the processor 102. The processor 102 is responsible for executing computer readable instructions stored in the memory 104. For example, the processor 102 may execute an operating system and one or more applications running within the operating system.

In some situations, specialized tasks may be offloaded onto a field programmable device. The FPD may execute computer readable instructions (i.e., logic) to perform a specialized task, such as encoding/decoding of data, data encryption, data analytics, or other tasks that are suitable for execution on a field programmable device. By offloading these specialized tasks to field programmable devices, the processing system 100 and its processor 102 is free to perform other tasks.

In the example of FIG. 1A, the processing system 100 includes six field programmable devices (e.g., FPD 110, FPD 112, FPD 114, FPD 116, FPD 118, and/or FPD 120). FPD 110 and FPD 112 are configured with Logic A, which represents logic for executing a first specialized task (i.e., a first type of workload). FPD 114 and FPD 116 are configured with Logic B, which represents logic for executing a second specialized task (i.e., a second type of workload). FPD 118 and FPD 120 are configured with Logic C, which represents logic for executing a third specialized task (i.e., a third type of workload).

If the load on FPD 110 and/or FPD 112 becomes too high (i.e., FPD 110 and/or FPD 112 becomes over utilized), one the remaining FPDs may be reprogrammed with Logic A to perform first specialized tasks (i.e., workloads of the first type). In one example as illustrated in FIG. 1A, one or both of FPD 114 and FPD 116 are identified as being over utilized. An FPD may be overutilized if its performance drops below a threshold, if it fails to execute a workload in a certain amount of time, if the demand on the FPD exceeds a threshold, if the delay in executing a workload exceed certain amount of time, if the number of requests on behalf of a workload waiting for FPD exceed certain limit, or for other suitable reasons.

Since one or both of FPD 114 and FPD 116 are over utilized, the processing system 100 identifies another one of the remaining FPDs as being underutilized. To determine if an FPD is underutilized, the processing system may determine that current demand on the FPD does not necessitate the need for the FPD, that the FPD has an amount of work below a threshold, or for other suitable reasons. If none of the other FPDs are underutilized, the other FPDs are not available for reprogramming, and each of the FPDs continues executing tasks as appropriate.

However, if one of the other FPDs is underutilized, the underutilized FPD may be reprogrammed In the present example of FIG. 1A, FPD 118 is identified as being under-utilized. In this example, FPD 118 is then reprogrammed with Logic B so that FPD 118 may execute a workload of the second type. To reprogram FPD 118, the processing system may stop FPD 118 from performing a workload of the third workload type and then move the workload of the third workload type to another field programmable device configured to perform the workload of the third workload type (e.g., FPD 120).

In another non-limiting example, an FPD can be identified to be reprogrammed with Logic B so that FPD 118 may execute a workload of the second type when FPD 118 is highly utilized but running lower priority workloads of a first type compared to the workload of second type.

Once the work is moved, the processing system 100 may bring FPD 118 offline, which may include entering a programming state. When the FPD 118 is online, the FPD 120 is responsible to process all the queued and un-processed requests waiting for the FPD 118. New requests requiring Logic C are processed by the FPD 120. In a non-limiting example, if the implementation has one queue for each FPD 118 and 120, and, for Logic C, there are two queues, the first queue for the requests to be run on the FPD 118 and the second queue for the requests to be run on the FPD 120, the requests in the first queue is merged into the second queue based on the time the request was added to the queue.

In another non-limiting example, if the implementation has one queue for all FPDs running Logic C and there is one queue where requests are retrieved by a dispatcher and sent to the FPDs 118 and 120, the dispatcher detects or notifies that the FPD 118 is offline and no longer dispatches future requests to FPD 118. In another non-limiting example, if the FPD 118 has been processing requests belonging to the same workload, the state information, such as the next memory location of the data to be process, is kept and used by the FPD 120 when processing the remaining requests belonging to the same workload.

Figure 1B:
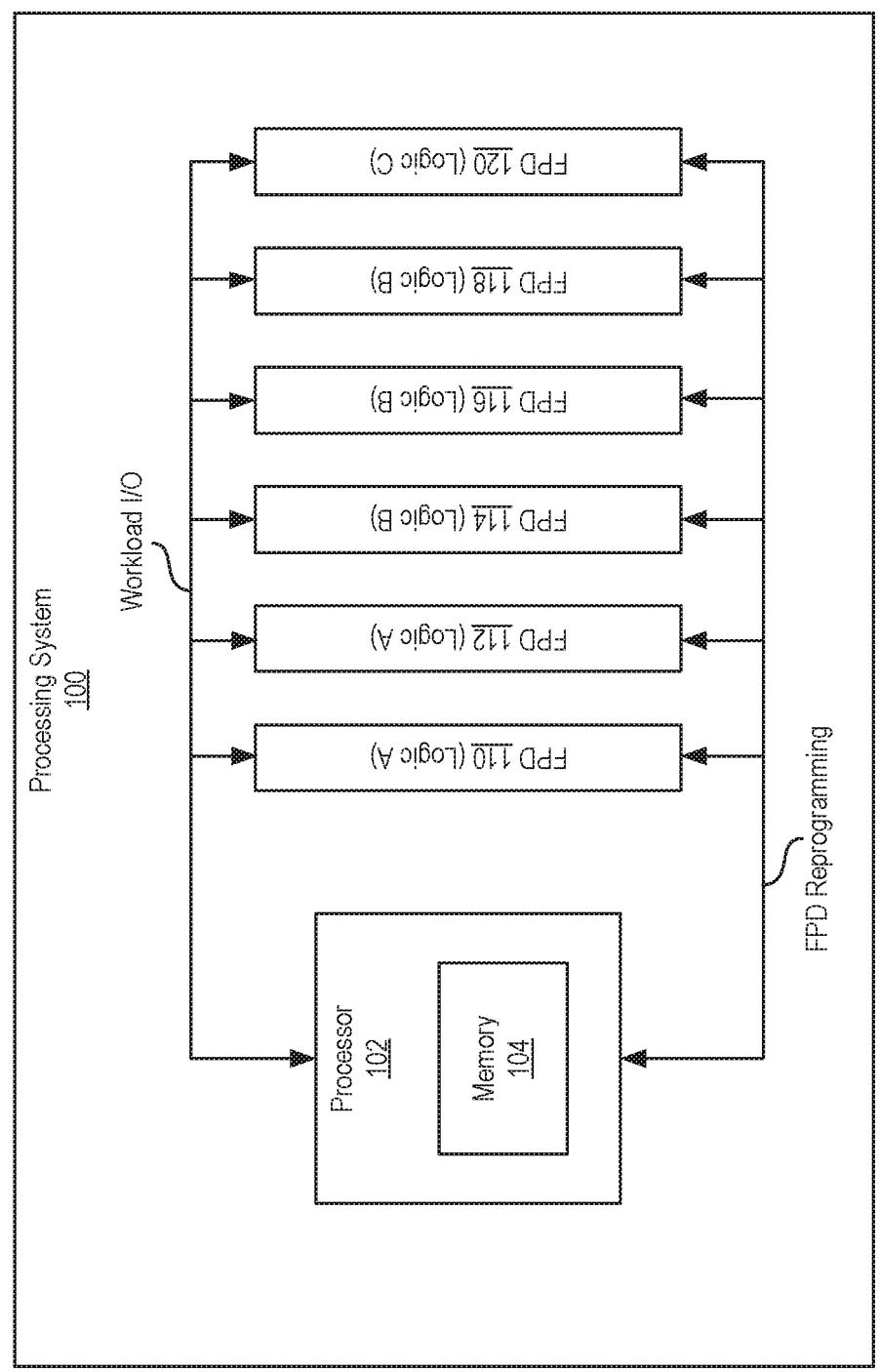

The processing system 100 then loads a new set of logic (i.e., Logic B) to FPD 118. As illustrated in FIG. 1B, FPD 118 is reprogrammed with Logic B, thereby enabling FPD 118 to execute workloads of the second type. The FPD 118 is then brought online to begin executing a specialized workload of the second type received from the processing system 100. In a non-limiting example, if the implementation has one queue for each FPD, then additional queues can be created for the FPD 118 reprogrammed with logic B. A subset of existing requests waiting in queues belonging to the FPDs 114 and 116 can be moved to the queue belong to the FPD 118. In another non-limiting example, if the implementation has one queue for all FPDs running Logic B, the dispatcher detects or notifies that the FPD 118 is available and dispatcher can dispatch requests from the queue to the FPD 118 for processing.

Figure 2:
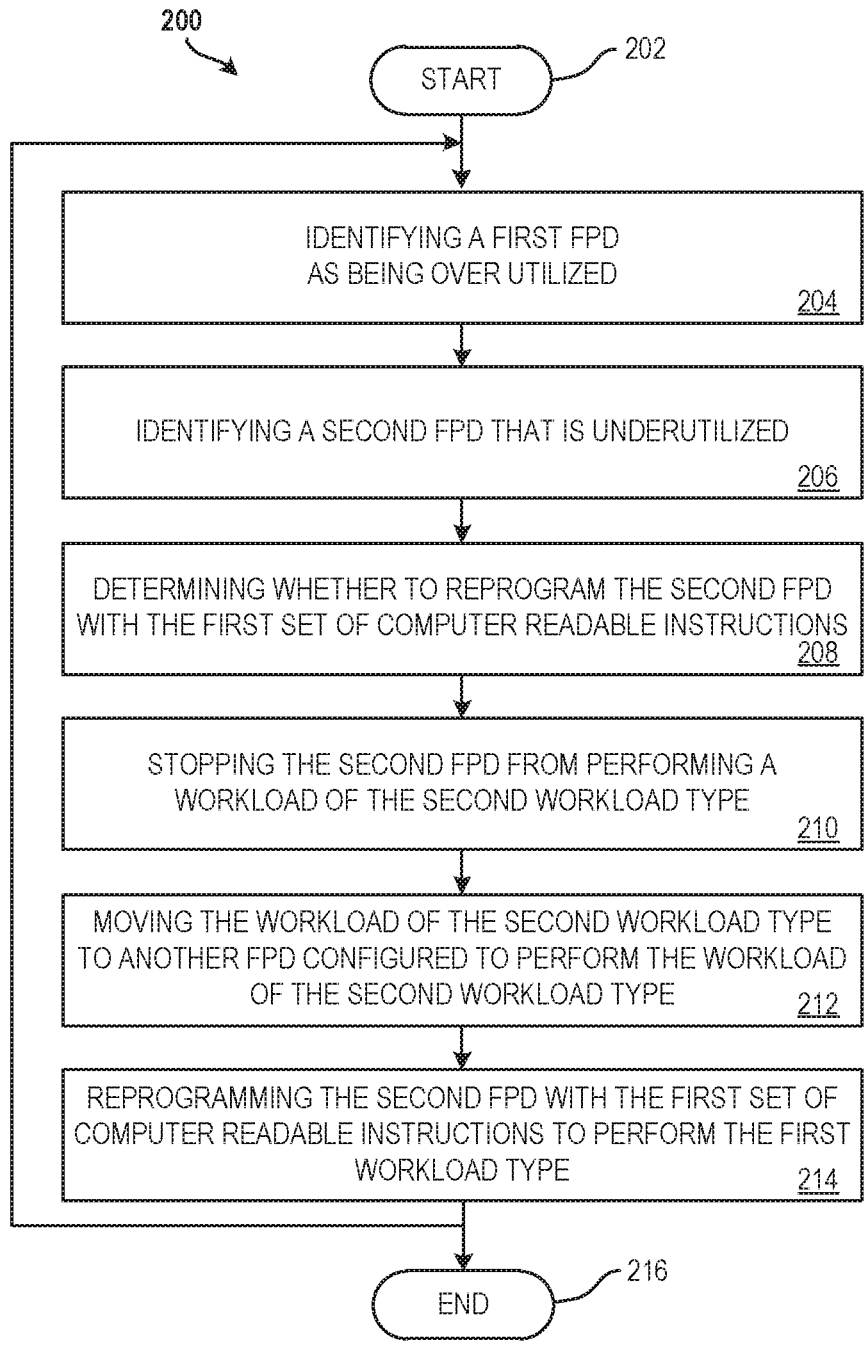
FIG. 2 illustrates a flow diagram of a method 200 for reprogramming a field programmable device on demand according to examples of the present disclosure.

FIG. 2 illustrates a flow diagram of a method 200 for reprogramming an FPD on demand according to examples of the present disclosure. The method 200 may be performed, for example, by a processing system such as the processing system 100 of FIG. 1A and FIG. 1B, by the processing system 20 of FIG. 4, or by another suitable processing system. The method 200 starts at block 202 and continues to block 204. It should be appreciated that, although the method 200 is described with reference to field programmable devices, it should be appreciated that the FPDs may be one of a field-programmable gate array, a programmable read-only memory, or a programmable logic device. The method 200 starts at block 202 and continues to block 204.

At block 204, the method 200 includes identifying, by a processing device, a first FPD as being over utilized, wherein the first FPD is configured with a first set of computer readable instructions to perform a first workload type.

At block 206, the method 200 includes, responsive to identifying the first FPD that is over utilized, identifying, by the processing device, a second FPD that is underutilized, wherein the second FPD is configured with a second set of computer readable instructions different from the first set of computer readable instructions to perform a second workload type. If no FPD is being over utilized, the method 200 may return to identify a first FPD as being over utilized at block 204, such as after waiting a delay time.

At block 208, the method 200 includes determining whether to reprogram the second FPD with the first set of computer readable instructions. In some examples, determining whether to reprogram the second FPD with the first set of computer readable instructions is based on at least one of a priority of a workload type, a current performance of the first FPD, a current performance of the second FPD, a projected performance of the first FPD after the second FPD is reprogrammed, a projected performance of the second FPD after the second FPD is reprogrammed, a demand level, a comparison of FPD performance before and after the second FPD is reprogrammed, a licensing requirement, a cost factor associated with an additional FPD running first set of computer readable instruction, another cost factor associated with not running second set of computer readable instruction on the second FPD, an electricity or power consumption and management requirement, compatibility between second FPD and first set of computer readable instructions, and a redundancy requirement.

As a non-limiting example, workload 1 is running on a first FPD with a first set of computer readable instructions, and the first FPD over-utilized at 100% with multiple requests waiting in queue. Workload 2 is running on a second FPD and a third FPD with a second set of computer readable instructions. The second and third FPDs are not over-utilized (e.g., they are at 80% for each of the FPDs or at 160% combined for both FPDs). It may be projected that after the second FPD is reprogrammed with the second set of computer readable instructions, each of the first and second FPD each will be at 60% utilization or 120% for both FPDs on behalf of workload 1. By comparing the projected overall FPD utilization of workload 1 at 120% with the overall FPDs utilization of workload 2 at 160%, it might be determined that the second FPD should not be reprogrammed with the first set of computer readable instructions. The above example is not limited to and can be extended to multiple workloads running on the first FPD with first set of computer readable instructions.

As a non-limiting example to determine utilization, the available capacity of a FPD can be calculated or estimated based on an "amount of additional work" it can process without causing the average number of queued requests to increase over a threshold. Then, the utilization can be calculated based on the available capacity over the total capacity, which can be calculated using the currently utilized capacity plus the available capacity.

As another non-limiting example, workload 1 running on a first FPD is currently having a response time of 5 seconds, while workload 2 running on a second FPD and a third FPD is currently having a response time of 2 seconds. It might be projected that after the second FPD is reprogrammed with the first set of computing readable instructions, workload 1 will have a response time of 3 seconds, while workload 2 will have a response time of 3 seconds.

As another non-limiting example, licensing of workload 1 might be billed on the utilization of the FPD, while software licensing of workload 2 might be billed on behalf of the entire FPD (i.e., assuming that the FPD is fully utilized for a workload). In the example above, even though overall FPD utilization of workload 1 is at 120%, while overall FPDs utilization of workload 2 at 160%, the licensing of workload 1 running on two FPDs is cheaper than workload 2 running on two FPDs. In addition, it might not be worthwhile to pay for the licensing cost of the entire FPD for workload 2, when only 60% of the FPD will be utilized (when the third FPD can be running at 100% utilized). Therefore, it can be decided that the second FPD should be reprogrammed to the first set of computer readable instructions. On the other hand, it might be determined that for workload 2, if more than 80% of the second FPD will be utilized (when the third FPD is running at 100% utilized), then the cost of charging for the entire FPD is reasonable.

The current and projected result (utilization, response time, licensing cost, etc.) can be compared against a specified performance policy or service level agreement, and the reprogramming action can be automatically triggered. The current and projected overall utilization can also be reported to the user, and the user can further analyze and manually invoke reprogramming action. The current and projected overall utilization can also be reported to and utilized by a workload management software. The workload management software can also take other performance management actions, such as workload migration, capacity upgrade on demand, into consideration.

At block 210, the method 200 includes, responsive to determining to reconfigure the second FPD with the first set of computer readable instructions, stopping the second FPD from performing a workload of the second workload type. Stopping the second FPD from performing the workload of the second workload type may include completing an executing workload of the second workload type before stopping the second FPD from performing an additional workload of the second workload type. This enables an executing workload to complete, but the second FPD may not accept additional workloads.

At block 212, the method 200 includes moving the workload of the second workload type to another FPD configured to perform the workload of the second workload type. In another FPD to move the workload to does not exist or is not available, the workload may be executed on a general purpose processor (i.e., the processor 102 of FIGS. 1A and 1B) using a computer executable code if available. In another example, the workload can be migrated to another processing system that has an FPD binary programmed in one of the FPDs suitable for performing the workload.

At block 214, the method 200 includes reprogramming the second FPD with the first set of computer readable instructions to perform the first workload type. In examples, reprogramming the second field programmable device with the first set of computer readable instructions to perform the first workload type includes: bringing the second field programmable device offline; loading the first set of computer readable instructions to the second field programmable device; and bringing the second field programmable device online.

The method 200 continues to block 216 and ends. In some examples, the method looks back to the start 202 and begins identifying over utilized FPDs again at block 204.

Additional processes also may be included. For example, the method 200 may include executing a workload of the first workload type on the second FPD after bringing the second field programmable device online.

It should be understood that the processes depicted in FIG. 2 represent illustrations, and that other processes may be added or existing processes may be removed, modified, or rearranged without departing from the scope and spirit of the present disclosure.

Figure 3:
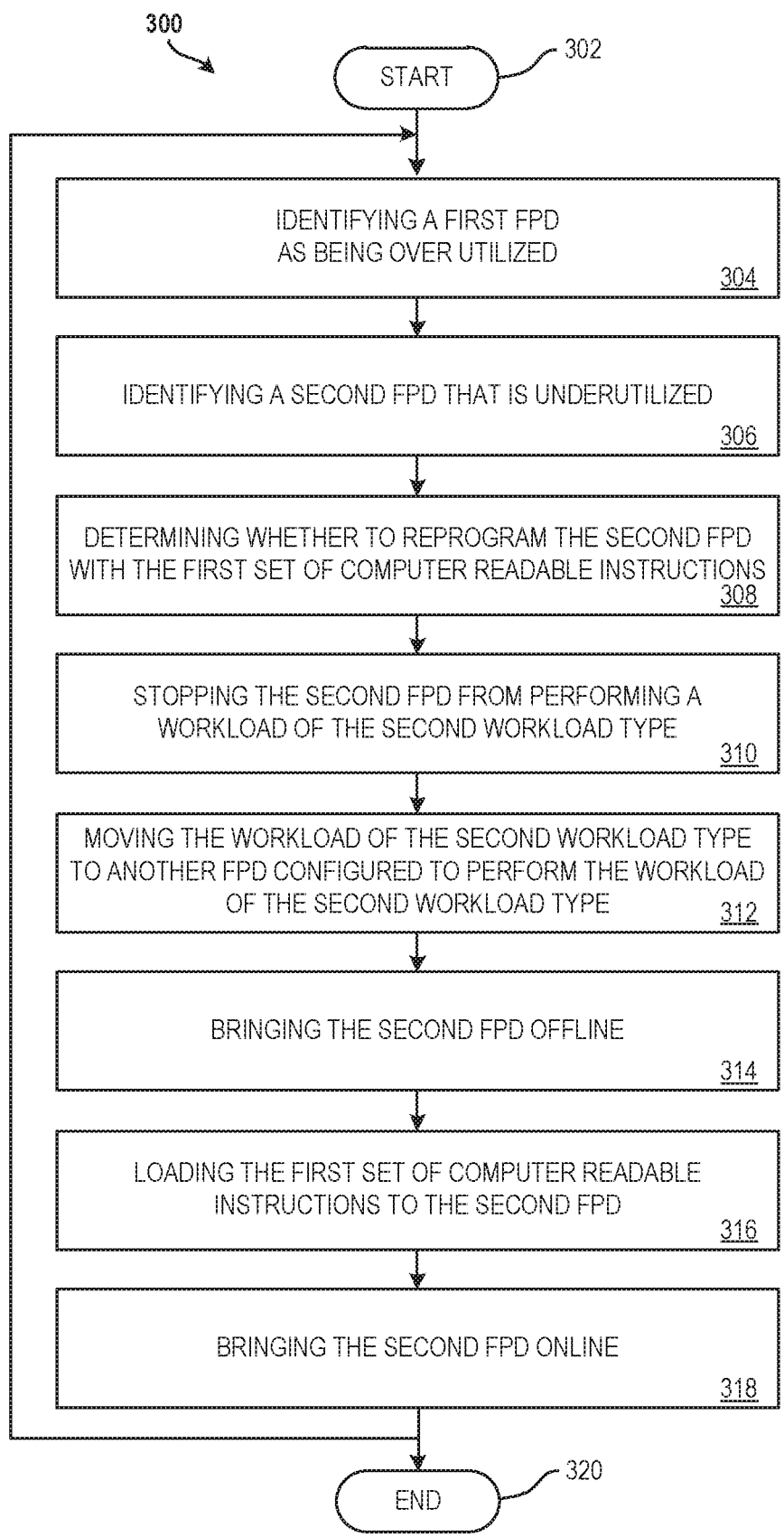
FIG. 3 illustrates a flow diagram of a method 200 for reprogramming a field programmable device on demand according to examples of the present disclosure.

FIG. 3 illustrates a flow diagram of a method 300 for reprogramming a FPD on demand according to examples of the present disclosure. The method 300 may be performed, for example, by a processing system such as the processing system 100 of FIG. 1A and FIG. 1B, by the processing system 30 of FIG. 4, or by another suitable processing system. The method 300 starts at block 302 and continues to block 304. It should be appreciated that, although the method 300 is described with reference to field programmable devices, it should be appreciated that the FPDs may be one of a field-programmable gate array, a programmable read-only memory, or a programmable logic device. The method 300 starts at block 302 and continues to block 304.

At block 304, the method 300 includes identifying, by a processing device, a first FPD as being over utilized, wherein the first FPD is configured with a first set of computer readable instructions to perform a first workload type.

At block 306, the method 300 includes, responsive to identifying the first FPD that is over utilized, identifying, by the processing device, a second FPD that is underutilized, wherein the second FPD is configured with a second set of computer readable instructions different from the first set of computer readable instructions to perform a second workload type.

At block 308, the method 300 includes determining whether to reprogram the second FPD with the first set of computer readable instructions. In some examples, determining whether to reprogram the second FPD with the first set of computer readable instructions is based on at least one of a priority of a workload type, a performance of the first FPD, a performance of the second FPD, a demand level, and a redundancy requirement.

In one example, a redundancy requirement may be implemented as follows, with reference to FIG. 1A. For example, a workload 1 is running on FPD 110 and FPD 112 and a workload 2 is running on FPD 114 and FPD 116. If FPD 114 fails, and in order to provide redundancy for workload 2, FPD 118 may be reprogramed with logic B for the execution of workload 2.

At block 310, the method 300 includes, responsive to determining to reconfigure the second FPD with the first set of computer readable instructions, stopping the second FPD from performing a workload of the second workload type. Stopping the second FPD from performing the workload of the second workload type may include completing an executing workload of the second workload type before stopping the second FPD from performing an additional workload of the second workload type. This enables an executing workload to complete, but the second FPD may not accept additional workloads.

At block 312, the method 300 includes moving the workload of the second workload type to another FPD configured to perform the workload of the second workload type.

At block 314, the method 300 includes bringing the second FPD offline.

At block 316, the method 300 includes loading the first set of computer readable instructions to the second FPD. The first set of computer readable instructions may be received from the processing system, for example.

At block 318, the method 300 includes bringing the second FPD online. The method 300 continues to block 320 and ends. In some examples, the method looks back to the start 302 and begins identifying over utilized FPDs again at block 304.

Additional processes also may be included. For example, the method 300 may include executing a workload of the first workload type on the second FPD after bringing the second field programmable device online.

It should be understood that the processes depicted in FIG. 3 represent illustrations, and that other processes may be added or existing processes may be removed, modified, or rearranged without departing from the scope and spirit of the present disclosure.

Figure 4:
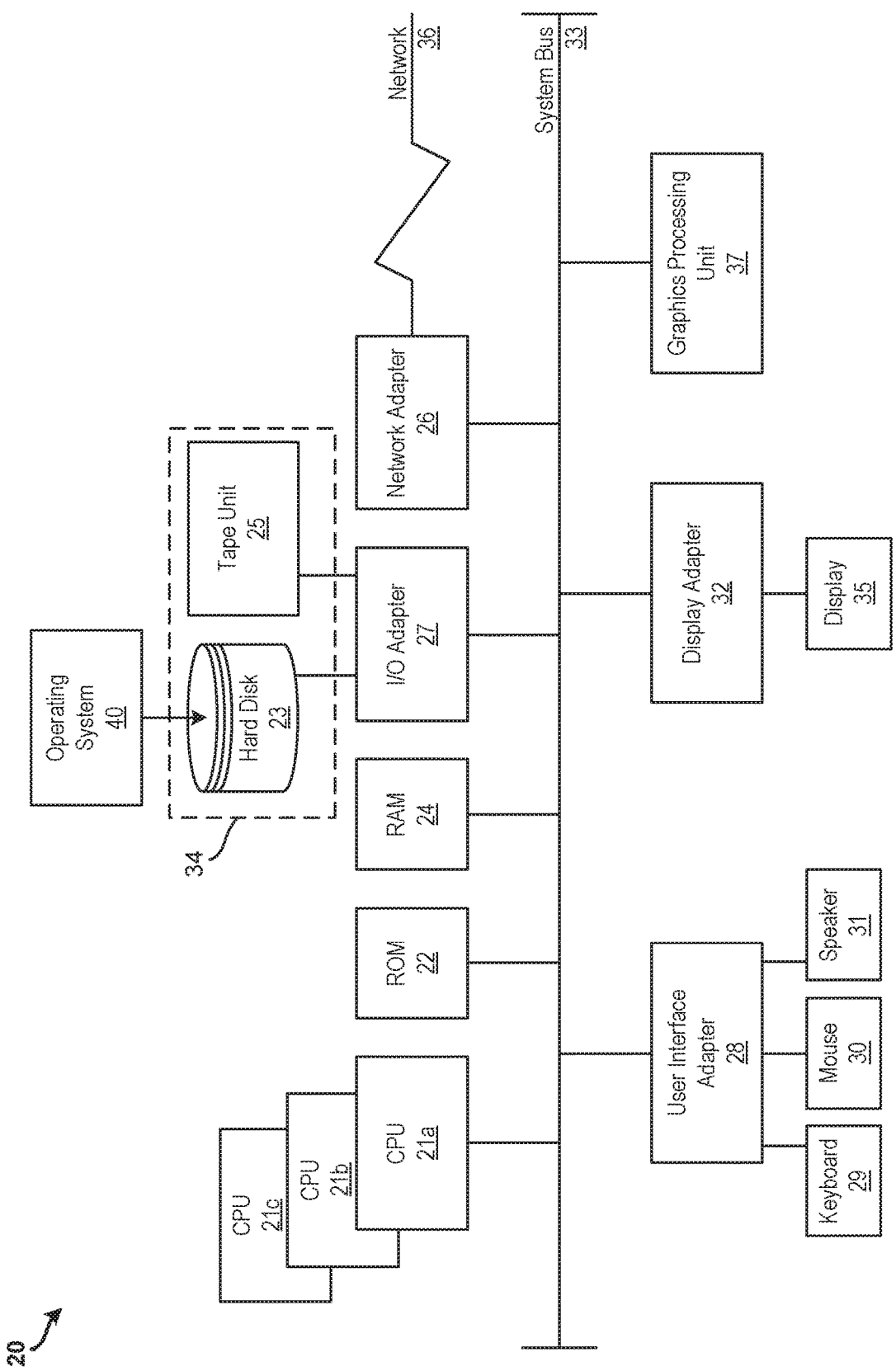
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for reprogramming a field programmable device on demand, the method comprising:
    identifying, by a processing device, a first field programmable device as being over utilized, wherein the first field programmable device is configured with a first set of computer readable instructions to perform a first workload type, wherein the first field programmable device is identified as being over utilized when a number of requests waiting to be executed by the first field programmable device exceeds a threshold;
    responsive to identifying the first field programmable device that is over utilized, identifying, by the processing device, a second field programmable device that is underutilized, wherein the second field programmable device is configured with a second set of computer readable instructions different from the first set of computer readable instructions to perform a second workload type;
    determining whether to reprogram the second field programmable device with the first set of computer readable instructions;
    responsive to determining to reprogram the second field programmable device with the first set of computer readable instructions, stopping the second field programmable device from performing a workload of the second workload type; and
    reprogramming the second field programmable device with the first set of computer readable instructions by loading the first set of computer readable instructions to the second field programmable device to cause the second field programmable device to perform the first workload type instead of the second workload type.

2. The computer-implemented method of claim 1, wherein reprogramming the second field programmable device with the first set of computer readable instructions to perform the first workload type further comprises:
    bringing the second field programmable device offline;
    loading the first set of computer readable instructions to the second field programmable device subsequent to bringing the second field programming device offline; and
    bringing the second field programmable device online subsequent to the loading.

3. The computer-implemented method of claim 2, further comprising executing a workload of the first workload type on the second field programmable device after bringing the second field programmable device online.

4. The computer-implemented method of claim 1, wherein determining whether to reprogram the second field programmable device with the first set of computer readable instructions is based on at least one of a priority of a workload type, a performance of the first field programmable device, a performance of the second field programmable device, a demand level, and a redundancy requirement.

5. The computer-implemented method of claim 1, wherein the field programmable device is one of a field-programmable gate array, a programmable read-only memory, or a programmable logic device.

6. The computer-implemented method of claim 1, wherein loading the first set of computer readable instructions to the second field programmable device comprises receiving the first set of computer readable instructions from the processing device.

7. The computer-implemented method of claim 1, wherein stopping the second field programmable device from performing the workload of the second workload type further comprises completing an executing workload of the second workload type before stopping the second field programmable device from performing an additional workload of the second workload type.

8. The computer-implemented method of claim 1, wherein determining whether to reprogram the second field programmable device with the first set of computer readable instructions further comprises:
    considering an impact to the first field programmable device as a result of reprogramming the second field programmable device with the first set of computer readable instructions; and
    considering an impact to other field programmable devices as a result of reprogramming the second field programmable device with the first set of computer readable instructions.

9. A system for reprogramming a field programmable device on demand, the system comprising:
    a memory having computer readable instructions; and
    a processing device for executing the computer readable instructions, the computer readable instructions comprising:
        identifying a first field programmable device as being over utilized, wherein the first field programmable device is configured with a first set of computer readable instructions to perform a first workload type, wherein the first field programmable device is identified as being over utilized when a number of requests waiting to be executed by the first field programmable device exceeds a threshold;
        responsive to identifying the first field programmable device that is over utilized, identifying a second field programmable device that is underutilized, wherein the second field programmable device is configured with a second set of computer readable instructions different from the first set of computer readable instructions to perform a second workload type;
        determining whether to reprogram the second field programmable device with the first set of computer readable instructions;
        responsive to determining to reprogram the second field programmable device with the first set of computer readable instructions, stopping the second field programmable device from performing a workload of the second workload type; and
        reprogramming the second field programmable device with the first set of computer readable instructions by loading the first set of computer readable instructions to the second field programmable device to cause the second field programmable device to perform the first workload type instead of the second workload type.

10. The system of claim 9, wherein reprogramming the second field programmable device with the first set of computer readable instructions to perform the first workload type further comprises:
    bringing the second field programmable device offline;
    loading the first set of computer readable instructions to the second field programmable device subsequent to bringing the second field programming device offline; and bringing the second field programmable device online subsequent to the loading.

11. The system of claim 10, the computer readable instructions further comprising executing a workload of the first workload type on the second field programmable device after bringing the second field programmable device online.

12. The system of claim 9, wherein determining whether to reprogram the second field programmable device with the first set of computer readable instructions is based on at least one of a priority of a workload type, a performance of the first field programmable device, a performance of the second field programmable device, a demand level, and a redundancy requirement.

13. The system of claim 9, wherein the field programmable device is one of a field-programmable gate array, a programmable read-only memory, or a programmable logic device.

14. The system of claim 9, wherein loading the first set of computer readable instructions to the second field programmable device comprises receiving the first set of computer readable instructions from the processing device.

15. The system of claim 9, wherein stopping the second field programmable device from performing the workload of the second workload type further comprises completing an executing workload of the second workload type before stopping the second field programmable device from performing an additional workload of the second workload type.

16. The system of claim 9, wherein determining whether to reprogram the second field programmable device with the first set of computer readable instructions further comprises:
considering an impact to the first field programmable device as a result of reprogramming the second field programmable device with the first set of computer readable instructions; and
considering an impact to other field programmable devices as a result of reprogramming the second field programmable device with the first set of computer readable instructions.

17. A computer program product for reprogramming a field programmable device on demand, the computer program product comprising:
a computer readable storage medium having program instructions embodied therewith, the program instructions executable by a processing device to cause the processing device to:
identifying a first field programmable device as being over utilized, wherein the first field programmable device is configured with a first set of computer readable instructions to perform a first workload type, wherein the first field programmable device is identified as being over utilized when a number of requests waiting to be executed by the first field programmable device exceeds a threshold;
responsive to identifying the first field programmable device that is over utilized, identify a second field programmable device that is underutilized, wherein the second field programmable device is configured with a second set of computer readable instructions different from the first set of computer readable instructions to perform a second workload type;
determine whether to reprogram the second field programmable device with the first set of computer readable instructions;
responsive to determining to reprogram the second field programmable device with the first set of computer readable instructions, stop the second field programmable device from performing a workload of the second workload type; and
reprogram the second field programmable device with the first set of computer readable instructions by loading the first set of computer readable instructions to the second field programmable device to cause the second field programmable device to perform the first workload type instead of the second workload type.

18. The computer program product of claim 17, wherein reprogramming the second field programmable device with the first set of computer readable instructions to perform the first workload type further comprises:
bringing the second field programmable device offline;
loading the first set of computer readable instructions to the second field programmable device subsequent to bringing the second field programming device offline; and
bringing the second field programmable device online subsequent to the loading.

19. The computer program product of claim 18, the program instructions further causing the processing device to execute a workload of the first workload type on the second field programmable device after bringing the second field programmable device online.

20. The computer program product of claim 17, wherein determining whether to reprogram the second field programmable device with the first set of computer readable instructions is based on at least one of a priority of a workload type, a performance of the first field programmable device, a performance of the second field programmable device, a demand level, and a redundancy requirement.

* * * * *